United States Patent
Nobumori et al.

(10) Patent No.: US 12,494,329 B2
(45) Date of Patent: Dec. 9, 2025

(54) ELECTRODE FOR CAPACITOR INCLUDING FLAKY CARBON, MANUFACTURING METHOD THEREFOR, AND CAPACITOR

(71) Applicant: Panasonic Intellectual Property Management Co., Ltd., Osaka (JP)

(72) Inventors: Chiho Nobumori, Hyogo Ken (JP); Kenichi Ezaki, Osaka Fu (JP); Hitoshi Ishimoto, Hyogo Ken (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 230 days.

(21) Appl. No.: 18/245,814

(22) PCT Filed: Sep. 27, 2021

(86) PCT No.: PCT/JP2021/035426
§ 371 (c)(1),
(2) Date: Mar. 17, 2023

(87) PCT Pub. No.: WO2022/065493
PCT Pub. Date: Mar. 31, 2022

(65) Prior Publication Data
US 2023/0343522 A1    Oct. 26, 2023

(30) Foreign Application Priority Data

Sep. 28, 2020   (JP) ................................. 2020-162312
Sep. 28, 2020   (JP) ................................. 2020-162633

(51) Int. Cl.
*H01G 11/32*   (2013.01)
*H01G 11/26*   (2013.01)
*H01G 11/86*   (2013.01)

(52) U.S. Cl.
CPC ............ *H01G 11/32* (2013.01); *H01G 11/26* (2013.01); *H01G 11/86* (2013.01)

(58) Field of Classification Search
CPC ........ H01G 11/32; H01G 11/26; H01G 11/86; H01G 11/24; H01G 11/36
See application file for complete search history.

(56) References Cited

U.S. PATENT DOCUMENTS

| 2009/0231781 A1 | 9/2009 | Yamada et al. |
| 2014/0030590 A1* | 1/2014 | Wang .................... H01M 4/366 977/734 |

(Continued)

FOREIGN PATENT DOCUMENTS

| CN | 105819885 A | 8/2016 |
| CN | 107500280 A | 12/2017 |

(Continued)

OTHER PUBLICATIONS

International Search Report dated Dec. 21, 2021 issued in International Patent Application No. PCT/JP2021/035426, with English translation.

*Primary Examiner* — Timothy J. Dole
*Assistant Examiner* — Daniel M Dubuisson
(74) *Attorney, Agent, or Firm* — Rimon P.C.

(57) ABSTRACT

Disclosed is a capacitor electrode including a conductive substrate and a flaky carbon that is electrically connected to the conductive substrate, the flaky carbon having an oxygen content of less than 5 mass % and a three-dimensional structure, wherein it is desired that the oxygen content of the flaky carbon is less than 2.6 mass %, and a log differential pore volume distribution of the capacitor electrode measured based on mercury porosimetry may have a maximum peak in a range of 0.3 μm or more and 6 μm or less.

7 Claims, 6 Drawing Sheets

(56) References Cited

U.S. PATENT DOCUMENTS

| | | | |
|---|---|---|---|
| 2015/0062778 A1 | 3/2015 | Gadkaree et al. | |
| 2015/0086881 A1* | 3/2015 | Zhamu | H01G 11/68 |
| | | | 429/231.95 |
| 2015/0098167 A1* | 4/2015 | El-Kady | H01G 11/32 |
| | | | 361/502 |
| 2015/0166348 A1 | 6/2015 | Ikenuma et al. | |
| 2015/0302994 A1 | 10/2015 | Nobumori et al. | |
| 2017/0148573 A1* | 5/2017 | Zhamu | H01G 11/46 |
| 2017/0194105 A1* | 7/2017 | Zhamu | H01G 11/24 |
| 2018/0040900 A1* | 2/2018 | Zhamu | H01M 4/663 |
| 2018/0155201 A1 | 6/2018 | Zhang | |
| 2018/0190986 A1* | 7/2018 | Zhang | C01B 32/22 |
| 2018/0286599 A1* | 10/2018 | Lin | H01G 11/32 |
| 2018/0330893 A1* | 11/2018 | Zhamu | H01G 11/28 |
| 2020/0095129 A1* | 3/2020 | Yarmolich | H01J 37/3467 |
| 2021/0091368 A1* | 3/2021 | House | H01M 4/525 |
| 2021/0126238 A1* | 4/2021 | Sadeghi | H01M 4/133 |

FOREIGN PATENT DOCUMENTS

| | | |
|---|---|---|
| CN | 108483428 A | 9/2018 |
| CN | 109516451 A | 3/2019 |
| JP | 2015-134706 A | 7/2015 |
| JP | 2016-535456 A | 11/2016 |
| JP | 2018-523623 A | 8/2018 |
| WO | 2007/023664 A1 | 3/2007 |
| WO | 2014/073190 A1 | 5/2014 |

* cited by examiner

ELECTRODE FOR CAPACITOR INCLUDING FLAKY CARBON, MANUFACTURING METHOD THEREFOR, AND CAPACITOR

CROSS-REFERENCE OF RELATED APPLICATIONS

This application is the U.S. National Phase under 35 U.S.C. § 371 of International Patent Application No. PCT/JP2021/035426, filed on Sep. 27, 2021, which in turn claims the benefit of Japanese Patent Application No. 2020-162312, filed on Sep. 28, 2020, and Japanese Patent Application No. 2020-162633, filed on Sep. 28, 2020 the entire disclosures of which Applications are incorporated by reference herein.

TECHNICAL FIELD

The present invention relates to a capacitor electrode, a method for producing the same, and a capacitor.

BACKGROUND ART

Graphene is a promising material for producing capacitor electrodes because it has a theoretical specific surface area of about 2600 $m^2/g$ and electrical conductivity.

Patent Literature 1 proposes an electrode that contains graphene, wherein the graphene has a carbon atomic composition measured based on X ray photoelectron spectroscopy of 90 atom % or more and less than 98 atom % and an oxygen atomic composition measured based on X ray photoelectron spectroscopy of 2 atom % or more and less than 10 atom %, the proportion of sp2 bonds between carbon atoms relative to the total number of bonds formed by carbon atoms measured based on X ray photoelectron spectroscopy is 50% or more and 80% or less, and the graphene has a resistivity of $2.0 \times 10^{-2}$ Ω·cm or less.

Patent Literature 2 proposes an electric double layer capacitor that includes: a first current collector made of a metal foil; a first polarizable electrode layer provided on the first current collector, the first polarizable electrode layer mainly containing activated carbon made from phenol resin and having a surface roughness of 0.6 μm or less and an electrode density of 0.5 $g/cm^3$ to 0.7 $g/cm^3$; a second current collector made of a metal foil; a second polarizable electrode layer that is provided on the second current collector and faces the first polarizable electrode layer, the second polarizable electrode layer mainly containing activated carbon made from phenol resin and having a surface roughness of 0.6 μm or less and an electrode density of 0.5 $g/cm^3$ to 0.7 $g/cm^3$; an insulating separator provided between the first polarizable electrode layer and the second polarizable electrode layer; and a driving electrolyte solution impregnated in the first polarizable electrode layer and the second polarizable electrode layer.

Patent Literature 3 proposes a capacitor electrode that includes: a conductive substrate; and an electrode portion that is electrically connected to the substrate, the electrode portion containing a plurality of carbon particles that are made of a first carbon material that is capable of absorbing and desorbing ions, and the electrode portion including voids formed therein, wherein the voids include a first void that has a diameter of 0.2 μm or more and 1.0 or less and a second void that has a diameter of 0.05 μm or more and less than 0.2 and a value obtained from (VA×VA)/(VB×M) is greater than 0.022, where the total volume of the first void per unit weight of the electrode portion is represented by VA, the total volume of the second void per unit weight of the electrode portion is represented by VB, and the volume of the electrode portion is represented by M.

CITATION LIST

Patent Literatures

[PTL 1] Laid-Open Patent Publication No. 2015-134706
[PTL 2] WO 2007/023664
[PTL 3] WO 2014/073190

SUMMARY OF INVENTION

Technical Problem

However, when the electrode produced in accordance with the method disclosed in Patent Literature 1 is applied to a capacitor, a large initial capacity can be obtained, but the capacity degradation over time is large, and there is a trade-off relationship between the initial capacity and the reliability.

Also, in the capacitors disclosed in Patent Literatures 2 and 3, activated carbon is used in the electrodes. Activated carbon has a large amount of surface functional groups, and there is a limit to maintaining the reliability over a long period of time, with a high voltage being applied thereto.

Solution to Problem

One aspect of the present invention relates to a capacitor electrode including: a conductive substrate; and a flaky carbon that is electrically connected to the conductive substrate, the flaky carbon having an oxygen content of less than 5 mass % and a three-dimensional structure.

Another aspect of the present invention relates to a capacitor electrode including: a conductive substrate; and a flaky carbon that is electrically connected to the conductive substrate and has a three-dimensional structure, wherein a log differential pore volume distribution of the capacitor electrode measured based on mercury porosimetry has a maximum peak in a range of 0.3 μm or more and 6 μm or less.

Still another aspect of the present invention relates to a capacitor that includes the capacitor electrode described above.

Still another aspect of the present invention relates to a method for producing a capacitor electrode, the method including the steps of: preparing an aqueous dispersion that contains graphene oxide; producing a first carbon from the graphene oxide contained in the aqueous dispersion; producing a second carbon from the first carbon; and connecting the second carbon to a conductive substrate, wherein the first carbon is a flaky carbon that has an oxygen content of 5 mass % or more and a three-dimensional structure, and the second carbon is a flaky carbon that has an oxygen content of less than 5 mass % and a three-dimensional structure.

Still another aspect of the present invention relates to a method for producing a capacitor electrode, the method including the steps of: preparing an aqueous dispersion that contains graphene oxide; producing a first carbon from the graphene oxide contained in the aqueous dispersion; producing a second carbon from the first carbon; and connecting the second carbon to a conductive substrate to obtain a capacitor electrode, wherein the first carbon is a flaky carbon that has a three-dimensional structure, and a log differential pore volume distribution of the capacitor electrode measured based on mercury porosimetry has a maximum peak in a range of 0.3 μm or more and 6 μm or less.

Advantageous Effects of Invention

According to the present invention, it is possible to obtain a highly reliable capacitor electrode and a highly reliable capacitor.

Novel features of the present invention are set forth in the appended claims. However, the present invention will be well understood from the following detailed description of the present invention with reference to the drawings, in terms of both the configuration and the content together with other objects and features of the present invention.

DESCRIPTION OF EMBODIMENT

Figure 1:
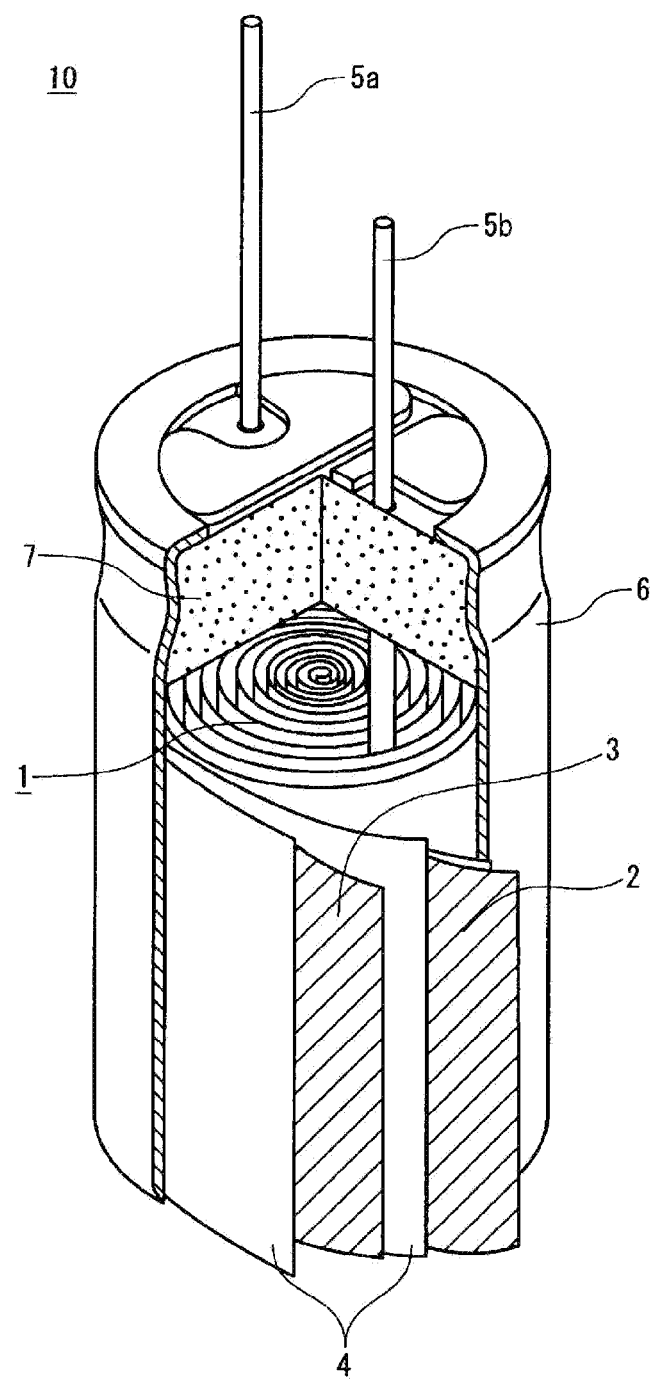
FIG. 1 is a perspective view, partially cut away, of an electric double layer capacitor according to the present invention.

In the description given below, the term "capacitor" refers to, for example, a power storage device such as an electric double layer capacitor or a lithium ion capacitor, and a capacitor electrode is used as an electrode in any of these devices. The power storage device includes a pair of electrodes and an electrolyte solution. The electrodes contain active materials.

An active material provides a capacity by doping and de-doping ions. The expression "doping ions into an active material" refers to the concept including absorbing ions into the active material, storing ions in the active material, a chemical interaction of the active material with ions, and the like. Likewise, the term "de-doping ions from an active material" refers to the concept including desorbing ions from the active material, releasing ions from the active material, removing a chemical interaction of the active material with ions, and the like. However, here, the term "doping ions into an active material" mainly means absorbing ions into the active material, and the term "desorbing ions from an active material" mainly means desorbing ions from the active material. When ions are absorbed into the active material, an electric double layer is formed, and a capacity is thereby provided. That is, the capacitor electrode mainly means a polarizable electrode, but may be an electrode that has the properties of a polarizable electrode and in which a faradaic reaction also contributes to providing the capacity.

In the specification of the present application, the flaky carbon that has an oxygen content of 5 mass % or more and a three-dimensional structure will also be referred to as "first carbon", and the flaky carbon that has an oxygen content of less than 5 mass % (preferably an oxygen content of less than 2.6 mass %) and a three-dimensional structure will also be referred to as "second carbon". Alternatively, the flaky carbon that has a three-dimensional structure that can form a capacitor electrode whose log differential pore volume distribution measured based on mercury porosimetry has a maximum peak in a range less than 0.3 μm may also be referred to as "first carbon", and the flaky carbon that has a three-dimensional structure that can form a capacitor electrode whose log differential pore volume distribution measured based on mercury porosimetry has a maximum peak in a range of 0.3 μm or more and 6 μm or less may also be referred to as "second carbon". The term "flaky carbon" mainly means a graphene analog such as reduced graphene oxide. Also, the first carbon and the second carbon may be collectively referred to as an "active material" or "carbon", without making any distinction therebetween.

Graphene is a carbon material that includes a graphene sheet with one carbon atom thickness as a minimum unit, and usually consists of a stack in which a plurality of graphene sheets are stacked. Hereinafter, the graphene may also be referred to as a "graphene sheet stack". A graphene sheet is a one-carbon atom thick assembly or molecule composed of sp2 bonded carbon atoms, and has a sheet-like honeycomb lattice structure.

Ordinary graphene is usually in the form of a flat sheet. On the other hand, the first carbon and the second carbon are graphene analogs, and are graphene sheet stacks of various configurations that have a disruption in a layer structure (or a disruption in an interlayer distance) (or have a three-dimensional structure), rather than a flat sheet configuration.

The first carbon can be obtained by using, for example, a production method including the steps of: (i) preparing an aqueous dispersion that contains graphene oxide; and (ii) producing first carbon from the graphene oxide contained in the aqueous dispersion. The second carbon can be obtained by using a production method including, in addition to the above-described steps, the step (iii) of producing second carbon from the first carbon.

Graphene oxide (hereinafter also referred to simply as "GO") has a structure in which oxygen-containing groups are bonded to graphene sheets. The oxygen-containing groups are considered to be bonded mainly to the edge planes of the graphene sheet stack. The oxygen-containing groups are hydrophilic groups such as a hydroxyl group, a carbonyl group, and a carboxyl group. The graphene oxide (GO) usually has diffusibility in a polar solvent such as water. The graphene oxide (GO) contains sp3 bonded carbon atoms, and thus usually has insulating properties.

By reducing the graphene oxide (GO), reduced graphene oxide (hereinafter, also referred to as "rGO") is obtained. The reduced graphene oxide (rGO) is a graphene analog that has electrical conductivity. The first carbon and the second carbon may also be expressed as reduced graphene oxides (rGOs) that have different oxygen contents or reduced graphene oxides (rGOs) that have different log differential pore volume distributions. However, it is sufficient that the first carbon and the second carbon respectively have the features of the first carbon and the features of the second carbon described in the specification of the present application, and there is no need to prove that the first carbon and the second carbon are necessarily encompassed in the category of reduced graphene oxide (rGO).

(A) Capacitor Electrode

A capacitor electrode according to the present embodiment includes a conductive substrate and second carbon that is electrically connected to the conductive substrate. As described above, the second carbon is flaky carbon that has an oxygen content of less than 5 mass % (preferably an oxygen content of less than 2.6 mass %) and a three-dimensional structure. As described above, a log differential pore volume distribution of the capacitor electrode measured based on mercury porosimetry may have a maximum peak in a range of 0.3 µm or more and 6 µm or less.

The conductive substrate is made using, for example, a metal, and functions as a current collector. The second carbon is contained in an electrode layer that is supported on the current collector as an active material. That is, specifically, the capacitor electrode includes, for example, a metal current collector and an electrode layer that is supported on the current collector and contains the second carbon.

(a) Second Carbon

The second carbon is flaky carbon that has an oxygen content of less than 5 mass % (preferably an oxygen content of less than 2.6 mass %) and a three-dimensional structure. The second carbon may be flaky carbon that has a three-dimensional structure that can form a capacitor electrode whose log differential pore volume distribution measured based on mercury porosimetry has a maximum peak in a range of 0.3 µm or more and 6 µm or less. The term "three-dimensional structure" mainly means a micro three-dimensional structure (or in other words, a micro structure) formed in the flaky particles. As a result of having the three-dimensional structure, overlaps between graphene sheets are more significantly suppressed, and the surface area of the second carbon can be more effectively used, as compared with graphene in the form of a flat sheet. A plurality of raised portions or a plurality of dented portions are formed in the main planes (mainly the 002 planes (basal planes)) of the graphene sheet stack that has the three-dimensional structure. With the three-dimensional structure described above, the distance between graphene sheets is appropriately controlled, and the overlaps between graphene sheets are effectively reduced.

The average number of graphene sheets stacked in the graphene sheet stack constituting the second carbon is, for example, 10 or less, and may be 5 or less. The closer to the thickness of a graphene sheet (or in other words, a monolayer sheet) with one carbon atom thickness that is a minimum unit the thickness of the graphene sheet stack, the more desirable.

As the average number of graphene sheets stacked, the number of graphene sheets that is estimated from an interplanar distance (d002) calculated from diffraction peaks attributed to the 002 planes (basal planes) in an X ray diffraction profile may be used (for example, Abstract of 2015 Autumn Meeting of the Physical Society of Japan, page 1014). Alternatively, an estimated value obtained from an electron microscope (SEM or the like) image of graphene may be used. For example, the number of graphene sheets stacked can be estimated from the scale of the SEM image of graphene and the interplanar distance between 002 planes (basal planes) of graphene sheets. For example, 20 graphene sheet stacks are randomly selected, and the number of graphene sheets stacked is estimated for each of the randomly selected graphene sheet stacks. Then, the top 5 largest numerical values and the top 5 smallest numerical values are removed, and an average value obtained from the remaining 10 numerical values may be defined as the average number of graphene sheets stacked.

The interlayer distance (or in other words, the distance between basal planes) between graphene sheets in the second carbon may vary randomly. The random variation in the interlayer distance means that the second carbon has low crystallinity. The larger the disruption in the stack structure of the second carbon, the more significant the variation in the interlayer distance.

The second carbon may have, as the three-dimensional structure, for example, a crimped or frizzy structure or a folded structure. At this time, each individual graphene sheet stack may have a microporous structure. Accordingly, the ion diffusibility in the vicinity of the surface of the second carbon is improved. Whether the second carbon has a frizzy structure or a folded structure can be determined from an electron microscope (SEM, TEM, or the like) image of the second carbon.

The term "frizzy structure" refers to, for example, a structure that has a plurality of randomly formed corrugated raised portions and dented portions. Also, the term "folded structure" refers to a structure that has folded portions formed by partially folding a single graphene sheet stack a plurality of times, and is encompassed in the category of frizzy structure. The height of raised portions or the depth of dented portions formed in the folded portions may be larger than the thickness of a carbon portion of the graphene sheet stack that has the folded structure, and may be twice or more the thickness of the carbon portion.

The X ray diffraction profile of the second carbon usually has a diffraction peak P1 attributed to the 002 plane. The diffraction peak P1 becomes sharper as the overlaps between graphene sheets increase and the crystallinity of the second carbon increases.

On the other hand, when the second carbon has a three-dimensional structure, the diffraction peak P1 becomes broad, and waveform separation of a plurality of peaks is possible. A halo pattern attributed to the amorphous phase may be observed on the high-angle side relative to the diffraction peak P1 of the X ray diffraction profile of the second carbon.

The interplanar distance (d002) between 002 planes of the second carbon calculated from the X ray diffraction profile may be, for example, 0.338 nm (3.38 Å) or more. The interplanar distance (d002) can be obtained by waveform-separating diffraction peaks observed in a region around $2\theta=26.38°$, calculating the interplanar distance (d002) for each component, and averaging the calculated values. The distance (d002) between 002 planes of the second carbon is preferably 0.340 nm (3.40 Å) or more, more preferably 0.360 nm (3.60 Å) or more, and even more preferably 0.370 nm (3.70 Å) or more.

The log differential pore volume distribution of the capacitor electrode formed using the second carbon measured based on mercury porosimetry may have a maximum peak in a range of 0.5 μm or more and 4 μm or less, in a range of 0.6 μm or more and 2 μm or less, or in a range of 0.7 μm or more and 2 μm or less. In this case, the capacitor electrode hierarchically includes micropores, mesopores, and macropores in a good balance, and thus the ion diffusibility is improved. Accordingly, the capacitor electrode has low resistance and is highly reliable. The log differential pore volume distribution described above can be achieved by, for example, controlling the amount of oxygen-containing groups contained in the second carbon.

The oxygen content of the second carbon is less than 5 mass %, and may be 4 mass % or less, 3 mass % or less, desirably less than 2.6 mass %, 2 mass % or less, or 1.5 mass % or less. When the oxygen content is reduced to less than 5 mass %, the reliability of the capacitor is significantly improved.

When the amount of oxygen-containing groups is significantly reduced, and the oxygen content of the second carbon is reduced, the log differential pore volume distribution of the capacitor electrode formed using the second carbon varies significantly. As a result, the reliability of the capacitor is improved.

Here, the reliability of a capacitor can be evaluated using, for example, a float charge test in which a predetermined voltage is constantly applied to the capacitor at a high temperature of about 60° C. The reliability of the capacitor can be determined from the capacity retention rate, the resistance increase rate, and the like of the capacitor after a predetermined period of time relative to the initial values, obtained by continuously performing float charging. The reliability is higher as the capacity retention rate is higher and the resistance increase rate is smaller.

It is difficult to completely reduce graphene oxide (GO), and thus the oxygen content of ordinary reduced graphene oxide (rGO) is 5 mass % or more. In contrast, the oxygen content of the second carbon can be reduced to less than 5 mass %. The reason is considered to be that, in addition to the fact that the condition for producing second carbon from the first carbon is optimized, the fact that the first carbon has a three-dimensional structure as described above as with the second carbon also contributes to ease of reduction of the amount of oxygen-containing groups.

The reason that the reliability of the capacitor is improved when the oxygen content of the second carbon is less than 5 mass % and the reason that the reliability of the capacitor is improved when the log differential pore volume distribution of the capacitor electrode measured based on mercury porosimetry has a maximum peak in a range of 0.3 μm or more and 6 μm or less are considered be as follows.

The first point is that reducing the oxygen content means reducing the amount of oxygen-containing groups. As a result of the amount of oxygen-containing groups being reduced, a pseudo-capacitance based on redox reactions between the oxygen-containing groups and an electrolyte solution component is reduced. The pseudo-capacitance contributes to increasing the initial capacity, but also contributes to promoting the degradation. Accordingly, the smaller the pseudo-capacitance, the more the reliability is improved.

The second point is that, as a result of the amount of oxygen-containing groups being reduced, the amount of reaction products produced by the redox reactions between the oxygen-containing groups and the electrolyte solution component is reduced. The reaction products close the pores of the electrode and reduce the ion diffusibility, and also reduce ion absorbing sites. Accordingly, the resistance increase rate increases and the capacity retention rate decreases as the amount of reaction products increases. Conversely, the resistance increase rate decreases and the capacity retention rate increases as the amount of reaction products decreases, and the reliability is improved.

The third point is that, as a result of the amount of oxygen-containing groups being reduced, the void volume of the second carbon is increased. Accordingly, an improvement in the charge discharge characteristics of the capacitor at low temperatures can also be expected. As a result of the amount of oxygen-containing groups present in the edge planes being mainly reduced, barriers to ion dispersion are significantly reduced, and the void volume of voids in the electrode that contains the second carbon increases. As a result of the barriers to ion dispersion being significantly reduced, ion dispersion smoothly takes place at low temperatures, and thus an improvement in the charge discharge characteristics of the capacitor at low temperatures can also be expected.

The ion diffusibility is affected by the volume of macropores. In particular, it is considered that macropores with a pore size of 0.2 μm or more and 1.5 μm or less, or 0.25 μm or more and 1.5 μm or less greatly affect the ion diffusibility. The integrated value of differential pore volume of pores with a pore size of 0.2 μm or more and 1.5 μm or less or 0.25 μm or more and 1.5 μm or less of the capacitor electrode measured based on mercury porosimetry may be, for example, 1 cm$^3$/g·log μm or more, 1.5 cm$^3$/g·log μm or more, or 2 cm$^3$/g·log μm or more. In this case, the reliability and the low temperature characteristics of the capacitor are significantly improved.

The log differential pore volume distribution is measured in the state of an electrode produced using the second carbon. The pores measured may include mesopores with a pore size of 0.01 μm (10 nm) and macropores with a pore size of 10 μm.

The second carbon that is flaky carbon that has a three-dimensional structure hierarchically includes micropores, mesopores, and macropores in a good balance. The second carbon with a good pore balance exhibits favorable elasticity when the electrode layer is rolled. Accordingly, due to a reaction force to the rolling stress, the particles are not deformed or broken even after rolling, and thus the original shape is likely to be maintained. For this reason, it is considered that voids with a sufficient size can be ensured between particles. Also, the state of voids in the capacitor electrode is affected by the diffusion of active material particles contained in a slurry for forming the electrode layer. The second carbon has excellent diffusibility, and the variation in the size of active material aggregates is small. Accordingly, it is considered that the size of spacing between aggregates is uniform in the electrode layer.

The log differential pore volume distribution can be measured based on mercury porosimetry in accordance with, for example, Test Methods for Pore Size Distribution of Fine Ceramic Green Body by Mercury Porosimetry specified in JIS R1655: 2003. In the mercury porosimetry, mercury is injected into the pores of a sample in an electrode in a low-pressure condition to measure the size of large-diameter pores. After that, in a high-pressure condition, mercury is allowed to permeate deep into the pores. The low-pressure condition is obtained by reducing pressure to about 50 μm Hg using a vacuum pump. As the method for injecting mercury into a sample, for example, a cell that houses the sample and has a mercury injection hole is used. The sample can be prepared by, for example, cutting out a piece with a size of 20 mm×50 mm from an electrode that includes a current collector and an electrode layer formed in the same manner as in Examples of the present application such that the cut-out piece includes a portion including the electrode layer. In the high-pressure condition, the pressure is increased to about 230 MPa to inject mercury into the sample. In the case where measurement is performed using an electrode cut out from a capacitor, the electrode is immersed in a highly volatile solvent (for example, dimethyl carbonate), cleaned under a reduced pressure of less than 0.1 MPa, and then dried under a reduced pressure of less than 01 MPa for 2 hours or more. The drying may be performed, for example, at ambient temperature.

The oxygen content of the second carbon can be measured based on an elemental analysis method. The oxygen content of the second carbon can be determined based on, for example, the direct quantification method (Annex 9) or the subtracting method (Annex 5) specified in JIS M8813: 2004. For example, the oxygen content may be measured using an oxygen·nitrogen·hydrogen analyzer (for example, model EGMA-830 available from Horiba, Ltd.). In this case, all oxygen contained in the sample is converted to carbon monoxide, and the released carbon monoxide is detected. The oxygen content of the sample is calculated from a calibration curve created using a standard sample.

(b) First Carbon

The first carbon is a precursor of the second carbon, and is flaky carbon that has a three-dimensional structure. The oxygen content of the first carbon may be 5 mass % or more. By heating the first carbon at a temperature of 700° C. or more in a non-oxidizing atmosphere, the second carbon is obtained. The oxygen content of the first carbon may be, for example, 10 mass % to 50 mass %, 20 mass % to 40 mass %, or 30 mass % to 40 mass %. The first carbon basically has the same three-dimensional structure as that of the second carbon, except that the oxygen content is different.

Specifically, the first carbon has a micro three-dimensional structure formed in the flaky particles. The main planes (mainly, 002 planes (basal planes)) of the graphene sheet stack that has the three-dimensional structure may have a plurality of raised portions or a plurality of dented portions. The first carbon may have, as the three-dimensional structure, for example, a frizzy structure or a folded structure described in the description of the second carbon.

The average number of graphene sheets stacked in the graphene sheet stack constituting the first carbon is, for example, 10 or less, and may be 5 or less. Also, the interlayer distance (or in other words, the distance between basal planes) between graphene sheets in the first carbon may vary randomly.

The X ray diffraction profile of the first carbon may have a diffraction peak P1 attributed to the 002 plane, and a halo pattern attributed to the amorphous phase may be observed on the high-angle side relative to the diffraction peak P1. The interplanar distance (d$002$) between 002 planes of the first carbon calculated from the X ray diffraction profile may be, for example, 0.338 nm (3.38 Å) or more, preferably 0.340 nm (3.40 Å) or more, 0.360 nm (3.60 Å) or more, or 0.370 nm (3.70 Å) or more.

(c) Binding Agent

The capacitor electrode may contain a binding agent. The binding agent functions to assist bonding between second carbon particles and bonding between the second carbon and the current collector when forming the second carbon into the electrode layer.

As the binding agent, for example, any of the following resins can be used: fluorine resins such as polytetrafluoroethylene (PTFE), polyvinylidene fluoride (PVdF), and a vinylidene fluoride-hexafluoropropylene copolymer (PVdF-HFP); water-soluble resins such as carboxymethyl cellulose (CMC), polyethylene oxide (PEO), polyethylene glycol (PEG), polyacrylonitrile (PAN), polymethyl methacrylate (PMMA), polyvinyl alcohol (PVA), polyvinylpyrrolidone (PVP), polyacrylic acid (PAA), and polyvinyl acetate; and the like.

(d) Third Component

The electrode layer may contain an active material such as, for example, activated carbon in addition to the second carbon. Also, the electrode layer may contain carbon fibers such as carbon nanotubes (CNTs) or carbon particles such as carbon black or graphite particles. However, from the viewpoint of achieving both high capacity and high reliability, the second carbon desirably constitutes 50 mass % or more of the electrode layer, and more desirably constitutes 65 mass % or more of the electrode layer.

(e) Current Collector

As the current collector, a metal foil, a metal porous body, or the like can be used. The current collector may be made of a material such as aluminum, copper, nickel, iron, stainless steel, or platinum. The current collector may be made of an alloy composed mainly of any of the above-listed metals. The metal foil may be a plain foil, a foil roughened through etching or the like, a plasma-treated foil, or the like. The metal porous body has, for example, a three-dimensional mesh structure.

The mass of the metal porous body per unit area may be, for example, 500 g/m$^2$ or less, or 150 g/m$^2$ or less. The porosity of the metal porous body may be, for example, 80 vol % to 98 vol %, or 90 vol % to 98 vol %.

The average size of voids in the metal porous body may be, for example, 50 μm or more and 1000 μm or less, 400 μm or more and 900 μm or less, or 450 μm or more and 850 μm or less.

(B) Method for Producing Capacitor Electrode

Next, an example of the method for producing a capacitor electrode will be described.

(i) Dispersion Preparation Step

First, an aqueous dispersion that contains a first carbon material is prepared. The aqueous dispersion may further contain, in addition to the first carbon material and water, a dispersant such as carboxymethyl cellulose (CMC), and the like. The first carbon material is a precursor of the first carbon. Here, graphene oxide is used as the first carbon material. Graphene oxide is produced by, for example, being separated from graphite in the form of a monolayer or a multilayer through oxidation of the graphite.

The oxidation of the graphite may be performed, for example, in water using an oxidant. As the oxidant, sulfuric acid, potassium permanganate, chromic acid, sodium dichromate, sodium nitrate, peroxide, persulfate, organic peracid, or the like may be used. A water-soluble solvent may be added to water. Examples of the water-soluble solvent include alcohols, ketones such as acetone, ethers such as dioxane and tetrahydrofuran, and the like. Through an oxidation reaction in water, an aqueous dispersion of graphene oxide is produced.

The oxygen content of the graphene oxide may be, for example, 10 mass % to 60 mass %, 20 mass % to 50 mass %, or 30 mass % to 50 mass %.

(ii) First Carbon Production Step

Next, an example of the step of producing first carbon (or in other words, reduced graphene oxide) from the graphene oxide contained in the aqueous dispersion will be described.

<First Reduction Step>

First carbon is produced by reducing graphene oxide in an aqueous dispersion that contains the graphene oxide. As the reducing method, it is preferable to use, for example, hydrothermal processing. For example, the aqueous dispersion is placed in an autoclave, and hydrothermal processing is performed to produce a gel-like product. The temperature of the hydrothermal processing may be, for example, 150° C. or more, and preferably 170° C. or more and 200° C. or less.

<Second Reduction Step>

It is possible to obtain flaky first carbon that has a three-dimensional structure by performing the hydrothermal processing alone. However, in order to further facilitate the reduction, the gel-like product may be brought into contact with a reducing agent. Examples of the reducing agent include metal hydrides, borohydrides, boranes, hydrazine, hydrazides, ascorbic acids, thioglycolic acids, cysteines, sulfites, thiosulfates, dithionites, and the like. For example, the gel-like product may be immersed in an aqueous solution that contains a water-soluble reducing agent such as sodium ascorbate. The temperature of the aqueous solution may be, for example, 20° C. to 110° C., 40° C. to 100° C., or 50° C. to 100° C. The amount of the reducing agent used may be adjusted as appropriate according to the type of reducing agent, the oxygen content of the first carbon material (graphene oxide), the amount of the gel-like product, and the like.

<Lyophilization Step>

After that, the gel-like product may be lyophilized (freeze-dried). Through lyophilization, it is possible to obtain a dry gel (xerogel) in which the three-dimensional structure of the first carbon is highly maintained. The lyophilization may be performed, for example, at a temperature of −50° C. to 0° C. and preferably −50° C. to −20° C. under a reduced pressure of 100 Pa or less, and preferably 1 Pa or less.

(iii) Second Carbon Production Step (Third Reduction Step)

Next, the first carbon is heated at temperature of 700° C. or more in a non-oxidizing atmosphere to produce second carbon.

The non-oxidizing atmosphere may be a reduced-pressure atmosphere (for example, 0.1 MPa or less (preferably 10 Pa or less)), a reducing atmosphere (for example, a hydrogen atmosphere of 0.01 MPa or less), an inert gas atmosphere (for example, a $N_2$, Ar, Ne, or He flow atmosphere), or the like.

The heating temperature in the non-oxidizing atmosphere may be 800° C. or more, 900° C. or more, 1000° C. or more, or 1200° C. or more. However, there is a limit to reducing the oxygen content of the second carbon produced. Taking the production cost into consideration, the heating temperature in the non-oxidizing atmosphere may be 1800° C. or less, 1400° C. or less, or 1200° C. or less. When defining the temperature range, these upper and lower limits may be combined in any way. The temperature range may be, for example, 1000° C. to 1800° C.

The heating duration in the non-oxidizing atmosphere can be selected as appropriate according to the heating conditions and the amount of the first carbon processed. For example, the heating duration may be about 0.5 to 5 hours.

(iv) Electroding Step

For example, a slurry is prepared by dispersing the second carbon in a dispersion medium such as water together with the binding agent. The obtained slurry is applied to a conductive substrate (current collector), and the coating film is dried to form an electrode layer supported on the current collector, and a capacitor electrode is thereby obtained. After that, the electrode layer may be rolled. The second carbon in the electrode layer is electrically connected to the conductive substrate (current collector).

(C) Capacitor

Next, an example of a capacitor that includes the above-described capacitor electrodes as a first electrode and a second electrode will be described. FIG. 1 is a perspective view, partially cut away, of an electric double layer capacitor 10.

The electric double layer capacitor 10 shown in the diagram includes a spirally wound capacitor element 1. The capacitor element 1 is formed by spirally winding a first electrode 2 and a second electrode 3, each in the form of a sheet, with a separator 4 interposed therebetween. The first electrode 2 includes a first current collector made of a metal and a first electrode layer supported on the surface of the first current collector. The second electrode 3 includes a second current collector that is made of a metal and a second electrode layer supported on the surface of the second current collector. The first electrode 2 and the second electrode 3 absorb and desorb ions to provide a capacity. As the first and second current collectors, for example, aluminum foils are used. The surfaces of the current collectors may be roughened using a method such as etching. As the separator 4, for example, a non-woven fabric composed mainly of cellulose is used. Lead wires 5a and 5b are connected to the first electrode 2 and the second electrode 3, respectively, as electricity extracting members. The capacitor element 1 is housed in a cylindrical outer case 6 together with an electrolyte solution (not shown). The outer case 6 may be made of a metal such as, for example, aluminum, stainless steel, copper, iron, or brass. The opening of the outer case 6 is sealed with a sealing member 7. The lead wires 5a and 5b are drawn to the outside through the sealing member 7. As the sealing member 7, for example, a rubber material such as butyl rubber is used.

The electrode layers each may contain an active material as the essential component, and optional components such as a binding agent and a conductive aid. The active material contains the second carbon that has the features that were already described above. The electrode layers each can be obtained by, for example, applying, to the surface of a current collector, a slurry obtained by kneading an active material, a binding agent (for example, carboxymethyl cellulose (CMC)), and the like together with water in a kneading machine, drying the coating film, followed by rolling.

The electrolyte solution may be a mixture of a solvent and an ionic substance (for example, an organic salt) dissolved in the solvent. The solvent may be a non-aqueous solvent or an ionic liquid. The concentration of the ionic substance in the electrolyte solution may be, for example, 0.5 mol/L to 2.0 mol/L.

As the non-aqueous solvent, it is preferable to use a high-boiling point solvent. Examples of the high-boiling point solvent that can be used include: lactones such as γ-butyrolactone; carbonates such as propylene carbonate; polyhydric alcohols such as ethylene glycol and propylene glycol; cyclic sulfones such as sulfolane; amides such as N-methylacetamide, N,N-dimethylformamide, and N-methyl-2-pyrolidone; esters such as methyl acetate; ethers such as 1,4-dioxane; ketones such as methyl ethyl ketone; formaldehyde; and the like.

The organic salt is a salt in which at least either anions or cations contain an organic substance. As the organic salt in which cations contain an organic substance, for example, a quaternary ammonium salt may be used. As the organic salt in which anions (or both ions) contain an organic substance, for example, any of the following organic salts may be used: trimethylamine maleate, triethylamine borodisalicylate, ethyl dimethylamine phthalate, mono1,2,3,4-tetramethyl imidazolium phthalate, mono1,3-dimethyl-2-ethylimidazolinium phthalate, and the like.

From the viewpoint of improving withstand voltage characteristics, the anions preferably contain fluorine atoms. For example, $BF_4^-$ and/or $PF_6^-$ can be used. A specific example of a preferred organic salt is a tetra alkyl ammonium salt such as ethyl trimethyl ammonium tetrafluoroborate.

The embodiment given above was described based on a spirally wound capacitor. However, the scope of the present invention is not limited thereto. The present invention is also applicable to a capacitor of any other configuration such as, for example, a stacked capacitor or a coin type capacitor.

Hereinafter, the present invention will be described in further detail based on examples. However, the present invention is not limited to the examples given below.

Experimental Example 1

An aqueous dispersion containing 1 mass % of graphene oxide serving as a first carbon material was subjected to hydrothermal processing at 180° C. for 6 hours to obtain a gel-like product (first reduction step).

Next, the gel-like product was immersed in an aqueous solution of sodium ascorbate (with a sodium ascorbate concentration of 1.0 mol/L) serving as a reducing agent, heated to 100° C., and held for 2 hours to sufficiently reduce carbon (second reduction step).

After that, the gel-like product was lyophilized (freeze-dried) at −20° C. under a reduced pressure of 100 Pa to obtain a xerogel (or in other words, first carbon). The oxygen content of the xerogel was measured to be 23 mass %. Also, X ray diffraction measurement was performed on the xerogel. As a result, a broad halo pattern attributed to the amorphous phase was observed on the high-angle side relative to a diffraction peak P1 attributed to the 002 plane, from which the presence of a frizzy structure or a folded structure was identified. The obtained X ray diffraction profile was analyzed to determine the interplanar distance (d002) of graphene, and it was confirmed that the interplanar distance (d002) of graphene was about 0.34 nm or more.

Figure 2A:
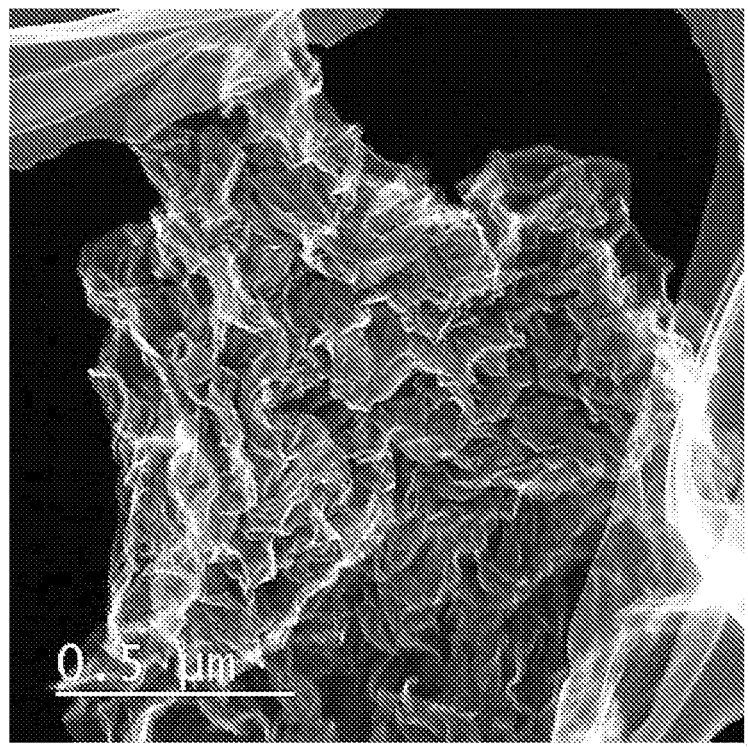
FIG. 2A is an electron microscope (TEM) image of a xerogel obtained in Example 1.
Figure 2B:
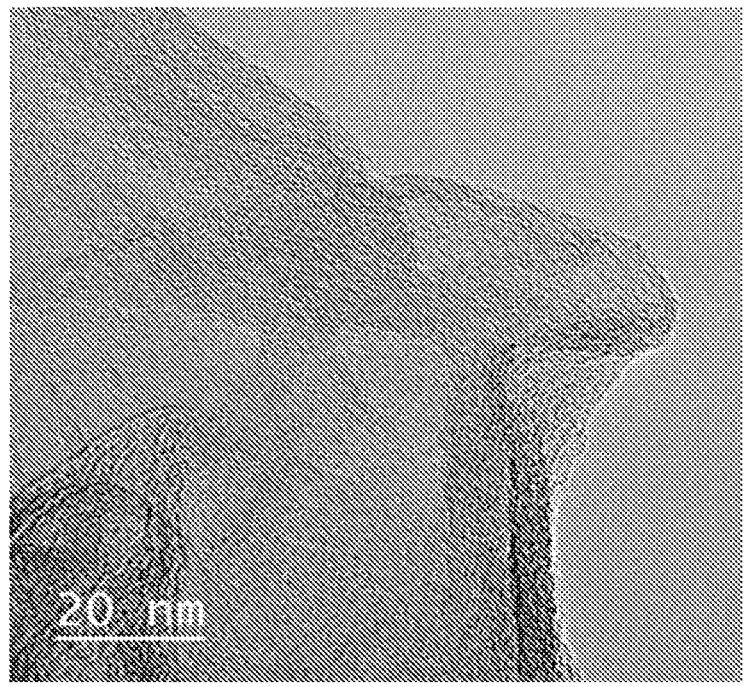
FIG. 2B is a partially enlarged view of the TEM image shown in FIG. 2A.

FIG. 2A shows a TEM image of the xerogel. From FIG. 2A, it can be understood that the first carbon contains flaky particles that have a three-dimensional structure. In the TEM image, a frizzy structure or a folded structure that has a plurality of randomly formed corrugated raised portions and dented portions is observed. The height of the raised portions or the depth of the dented portion of the folded portions is sufficiently larger than the thickness of the carbon portion, and is at least twice or more the thickness of the carbon portion. FIG. 2B is a partially enlarged view of the TEM image shown in FIG. 2A. From the enlarged view of the image, it is possible to confirm that a large number of basal planes of the graphene sheet stack are present on the particle surface, and edge planes are less exposed.

Experimental Examples 2 to 8

Figure 3A:
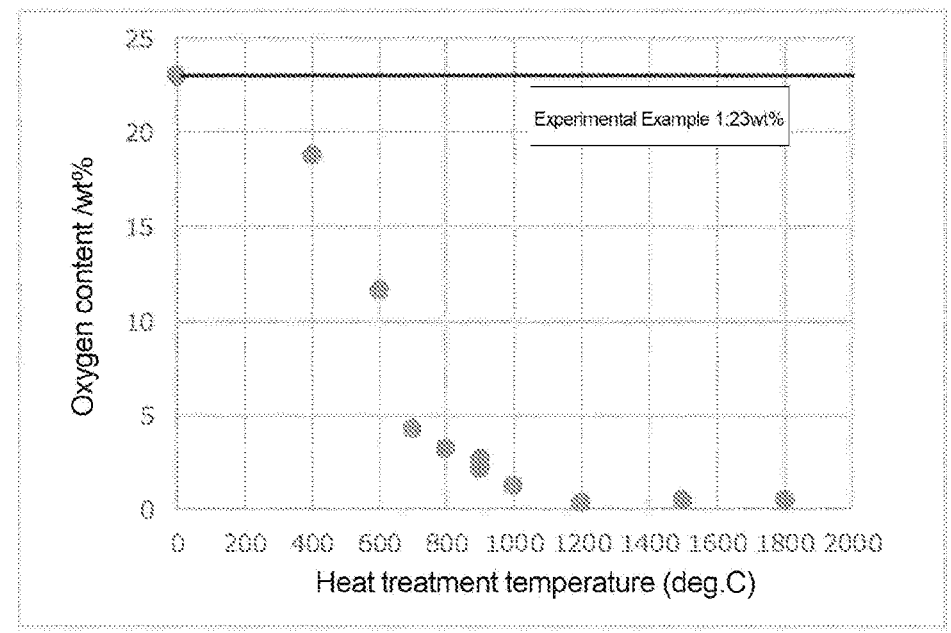
FIG. 3A is a diagram showing a relationship between active material heat treatment temperature and oxygen content.

Next, the xerogel was subjected to heat treatment (third reduction step) in which the xerogel was heated in a nitrogen flow atmosphere for 10 minutes to 2 hours at a temperature of 400° C. (Experimental Example 2), 600° C. (Experimental Example 3), 700° C. (Experimental Example 4), 800° C. (Experimental Example 5), 900° C. (Experimental Example 6), 1000° C. (Experimental Example 7), 1200° C. (Experimental Example 8), 1500° C. (Experimental Example 9), and 1800° C. (Experimental Example 10). After that, the oxygen content of the obtained carbon was measured. In Experimental Example 4, the oxygen content was less than 5 mass %. In Experimental Example 8, the oxygen content was less than 0.4 mass %. On the other hand, in Experimental Example 2, the oxygen content was about 18 mass %. FIG. 3A shows a relationship between the heat treatment temperature and the oxygen content. From FIG. 3A, it can be understood that the heat treatment is required to be performed at a temperature of 700° C. or more to obtain second carbon with an oxygen content of less than 5 mass %. It can also be understood that the oxygen content can be more significantly reduced by performing the heat treatment at a temperature of 1000° C. or more.

Each heat treated carbon was observed using a TEM, and it was confirmed that they were flaky particles with the same three-dimensional structure as that before the heat treatment. Also, each heat treated carbon was subjected to X ray diffraction measurement. As a result, a broadly spread halo pattern attributed to the amorphous phase was observed around a diffraction peak P1 attributed to the 002 plane and serving as the center, from which the presence of a frizzy structure or a folded structure was identified. Furthermore, the obtained X ray diffraction profile was analyzed to determine the interplanar distance (d002) of graphene, and it was confirmed that the interplanar distance (d002) shifted to a value slightly smaller than that before the heat treatment. This is presumably due to the recovery of the order (π-π bond) in the basal plane direction.

Examples 1 to 3

Spirally wound electric double layer capacitors (Φ18 mm×L (length) 70 mm) with a rated voltage of 2.5V were produced. Hereinafter, a specific method for producing the electric double layer capacitors will be described.

In Examples 1, 2, and 3, capacitor electrodes were produced using the second carbon with an oxygen content of less than 5 mass % obtained in Experimental Example 4 (the heat treatment was performed at 700° C.), the second carbon with an oxygen content of less than 5 mass % obtained in Experimental Example 7 (the heat treatment was performed at 1000° C.), and the second carbon with an oxygen content of less than 5 mass % obtained in Experimental Example 8 (the heat treatment was performed at 1200° C.), respectively, as the active material. Specifically, in each example, a slurry was prepared by dispersing 100 parts by mass of the second carbon and 10 parts by mass of CMC serving as a binding agent in an appropriate amount of water. The obtained slurry was applied to a 30 μm-thick current collector made of an Al foil, and the coating film was vacuum dried at 110° C., followed by rolling to form an electrode layer. In this way, a capacitor electrode was obtained.

A pair of electrodes were prepared, and lead wires were connected to the electrodes, respectively. Then, the electrodes were spirally wound with a non-woven fabric of cellulose serving as a separator interposed therebetween. In this way, a capacitor element was obtained. The obtained capacitor element was housed in a predetermined outer case together with an electrolyte solution, and the opening of the outer case was sealed using a sealing member. In this way, a capacitor A1 of Example 1 (the heat treatment was performed at 700° C.), a capacitor A1 of Example 2 (the heat treatment was performed at 1000° C.), and a capacitor A3 of Example 3 (the heat treatment was performed at 1200° C.) were obtained. As the electrolyte solution, a solution obtained by dissolving ethyl dimethylimidazolium tetrafluoroborate in propylene carbonate serving as a non-aqueous solvent at a concentration of 1.0 mol/L was used. After that, each of the capacitors was subjected to aging treatment at 60° C. for 6 hours while applying a rated voltage of 2.5V.

Comparative Examples 1 and 2

In Comparative Examples 1 and 2, a capacitor B1 of Comparative Example 1 and a capacitor B2 of Comparative Example 2 were produced by producing a pair of electrodes in the same manner as in Examples 1 and 2, except that the carbon with an oxygen content of greater than 5 mass % obtained in Experimental Example 1 (no heat treatment was performed) and the carbon with an oxygen content of greater than 5 mass % obtained in Experimental Example 2 (the heat treatment was performed at 400° C.) were used, respectively, as the active material.

Figure 3B:
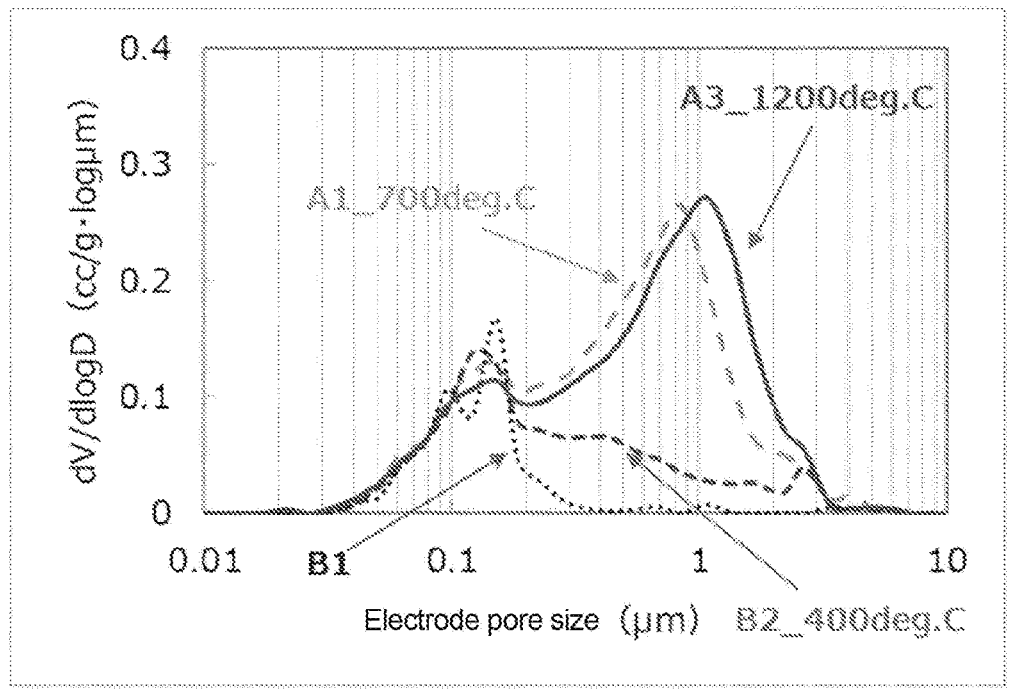
FIG. 3B is a diagram showing a relationship between active material heat treatment temperature and log differential pore volume distribution.

The electrodes of the capacitors (A1, A3, B1, and B2) were subjected to log differential pore volume distribution measurement. FIG. 3B shows a relationship between the active material heat treatment temperature and the log differential pore volume distribution. As shown in FIG. 3B, there is a large difference in the log differential pore volume distribution between: (a) the capacitors A1 and A3 obtained by performing the heat treatment at 700° C. or more; and (b) the capacitor B1 obtained without performing the heat treatment and the capacitor B2 obtained by performing the heat treatment at 400° C. Also, the cumulative pore volumes of the capacitors A1 and A3 increased markedly as compared with those of the capacitors B1 and B2.

The log differential pore volume distribution of the capacitor A3 has a maximum peak at an electrode pore size of roughly 1 μm, and the integrated value of differential pore volume of pores with a pore size of 0.2 μm to 1.5 μm is greater than 2 cm$^3$/g·log μm. The log differential pore volume distribution of the capacitor A1 has a maximum peak at an electrode pore size of roughly 0.8 μm, and the integrated value of differential pore volume of pores with a pore size of 0.2 μm to 1.5 μm is about 1.8 cm$^3$/g·log μm. Accordingly, the carbon contained in each of the capacitors A1 and A3 is classified into the second carbon.

On the other hand, the log differential pore volume distribution of the capacitor B1 has a maximum peak at 0.2 μm or less, and the integrated value of differential pore volume of pores with a pore size of 0.2 μm to 1.5 μm is substantially zero. The log differential pore volume distribution of the capacitor B2 also has a maximum peak at 0.2 μm or less, and the integrated value of differential pore volume of pores with a pore size of 0.2 μm to 1.5 μm is about 0.6 cm$^3$/g·log μm. The carbon contained in each of the capacitors B1 and B2 is classified into the first carbon.

[Float Charge Test (I)]

The reliability of each of the capacitors (A1, A2, A3, B1, and B2) was evaluated based on a float charge test. Specifically, a voltage of 2.8 V was constantly applied to the capacitor at 60° C., during which variation in the capacity retention rate of the capacitor relative to the initial capacity was measured. The capacity retention rate is a relative value when the initial capacity after aging is set to 100%.

Figure 4:
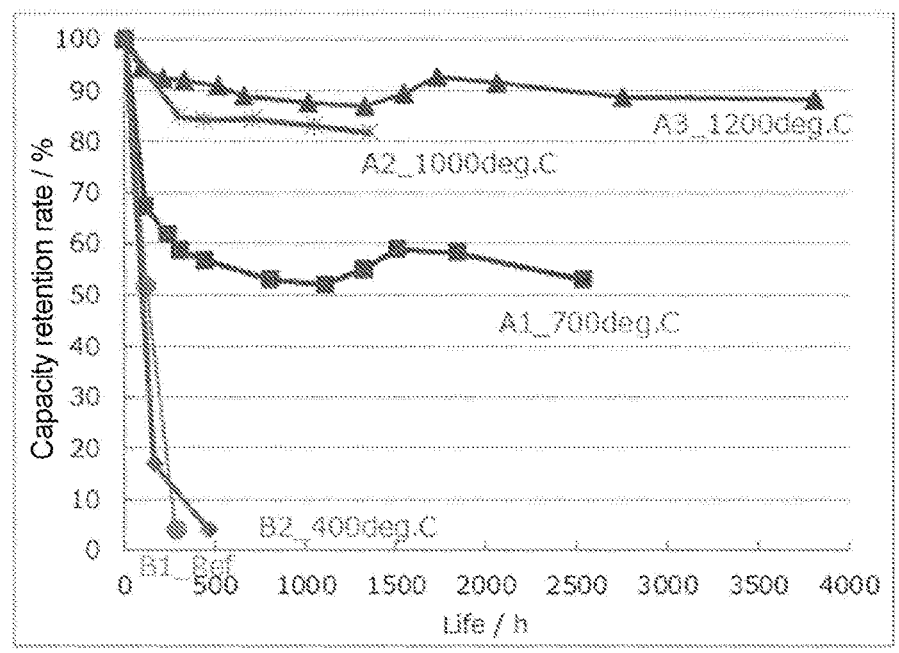
FIG. 4 is a diagram showing the results of a reliability test (60° C./2.8 V) performed on capacitors (produced in Examples 1, 2, and 3, and Comparative Examples 1 and 2) that include electrodes that contain active materials that have different oxygen contents or log differential pore volume distributions.

FIG. 4 shows the variation (60° C./2.8 V) in the capacity retention rate of each of the capacitors (A1, A2, A3, B1, and B2). From FIG. 4, it can be seen that, with the capacitors B1 and B2 each obtained using the first carbon with an oxygen content of greater than 5 mass %, the capacity retention rate decreased significantly. On the other hand, with the capacitors A1 and A3 each obtained using the second carbon with an oxygen content of less than 5 mass %, the capacity retention rate was maintained at a high level even after 2500 hours, from which it can be understood that the long term reliability of the capacitors A1 and A3 is high. In particular, with the capacitor A3 with the second carbon with an oxygen content of 0.4 mass %, the capacity close to the initial capacity is maintained even after 3500 hours.

[Float Charge Test (II)]

The capacitor A3 that exhibited the highest reliability in the float charge test (I) was further subjected to another float charge test in which a voltage of 3.0 V was constantly applied to the capacitor at 60° C., during which variation in the capacity retention rate of the capacitor relative to the initial capacity was measured.

Figure 5:
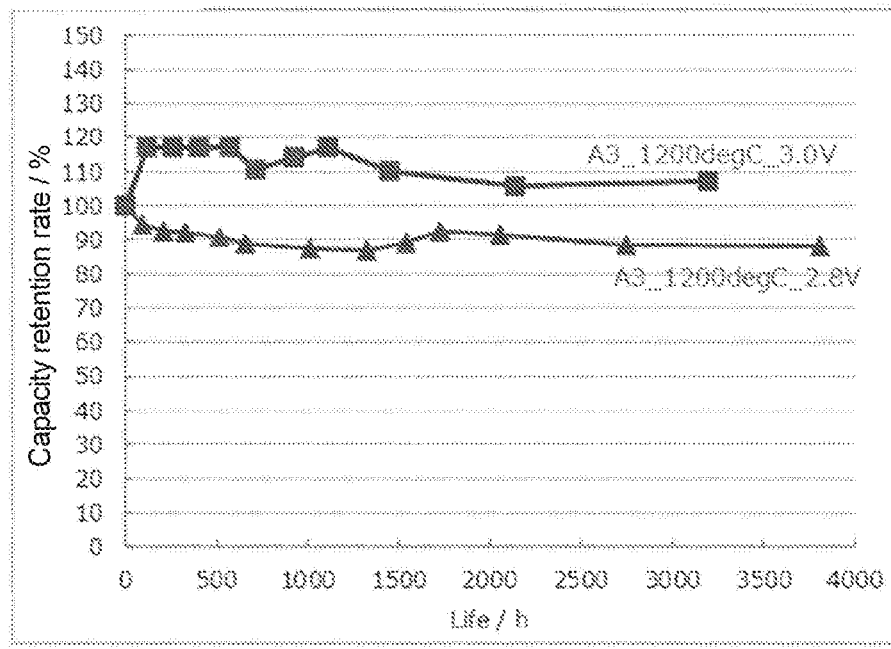
FIG. 5 is a diagram showing the results of another reliability test (60° C./2.8 V and 60° C./3.0 V) performed on the capacitor produced in Example 3.

FIG. 5 shows the variation in the capacity retention rate at a voltage of 3.0 V relative to the variation in the capacity retention rate at a voltage of 2.8 V. From FIG. 5, it can be understood that a further favorable capacity retention rate can be obtained by increasing the voltage, from which it can be seen that the capacitor A3 also excels in terms of withstand voltage characteristics. Such an improvement in the capacity retention rate obtained by increasing the voltage cannot be observed in, for example, ordinary capacitors obtained using activated carbon, and it is therefore a phenomenon specific to the capacitor A3.

Figure 6A:
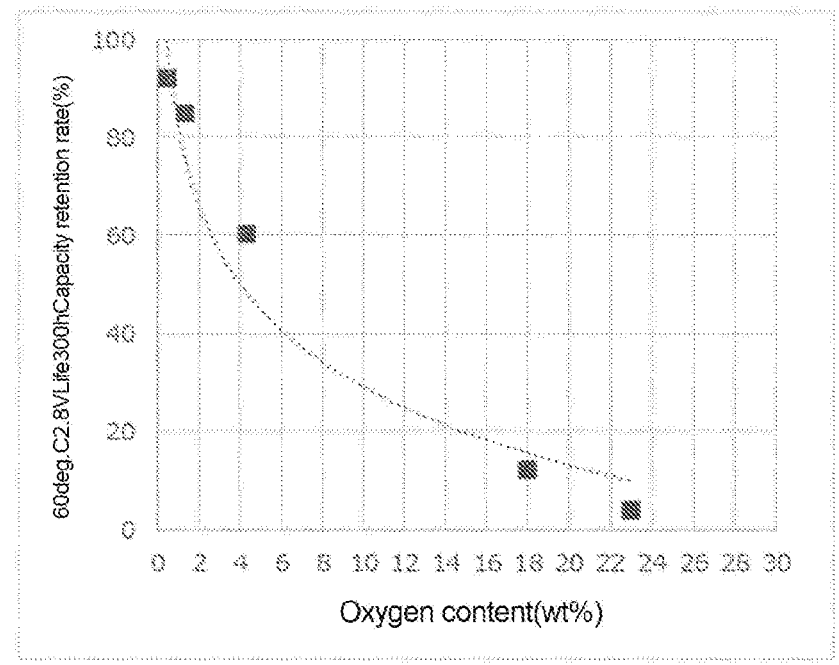
FIG. 6A is a diagram showing a relationship between the oxygen content of active material and capacity retention rate after 300 hours from a reliability test (60° C./2.8 V).

FIG. 6A is a diagram obtained by re-plotting the data shown in FIG. 4 so as to show a relationship between the oxygen content and the capacity retention rate after 300 hours from float charging FIG. 6A shows a tendency of an exponential improvement in the capacity retention rate as the oxygen content of the active material decreases.

Figure 6B:
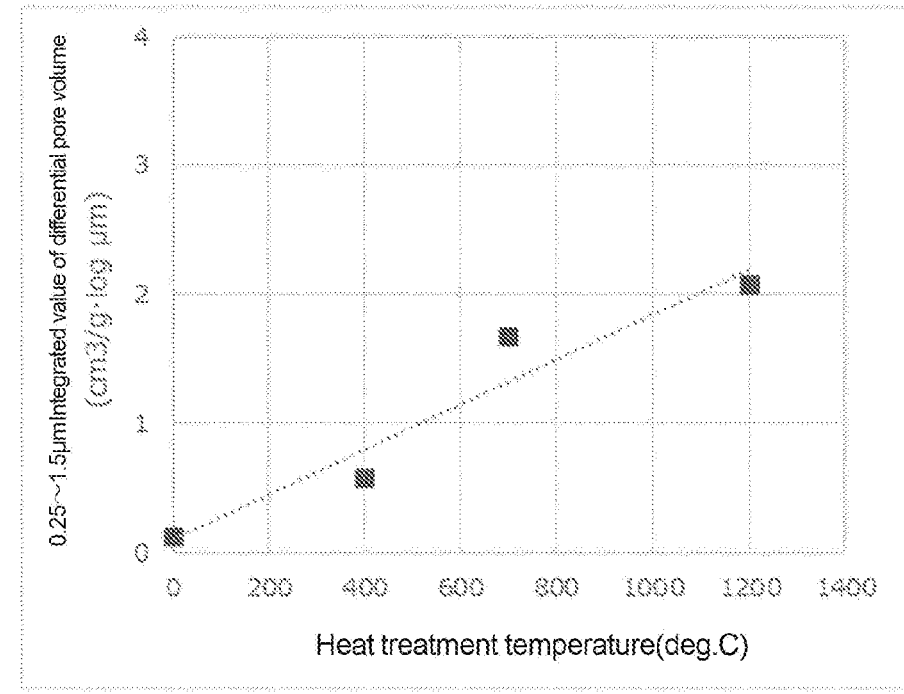
FIG. 6B is a diagram showing a relationship between active material heat treatment temperature and integrated value of differential pore volume of pores with a pore size of 0.25 μm to 1.5 μm.

FIG. 6B is a diagram showing a relationship between the active material heat treatment temperature and the integrated value of differential pore volume of pores with a pore size of 0.25 μm to 1.5 μm of the capacitors A1, A3, B1, and B2. From FIG. 6A, it can be seen that the volume of macropores with a pore size of 0.25 μm to 1.5 μm in the electrode layer increases as the heat treatment temperature increases. This suggests that the increase in the volume of macropores in the electrode layer is highly relevant to the improvement of reliability.

Figure 7A:
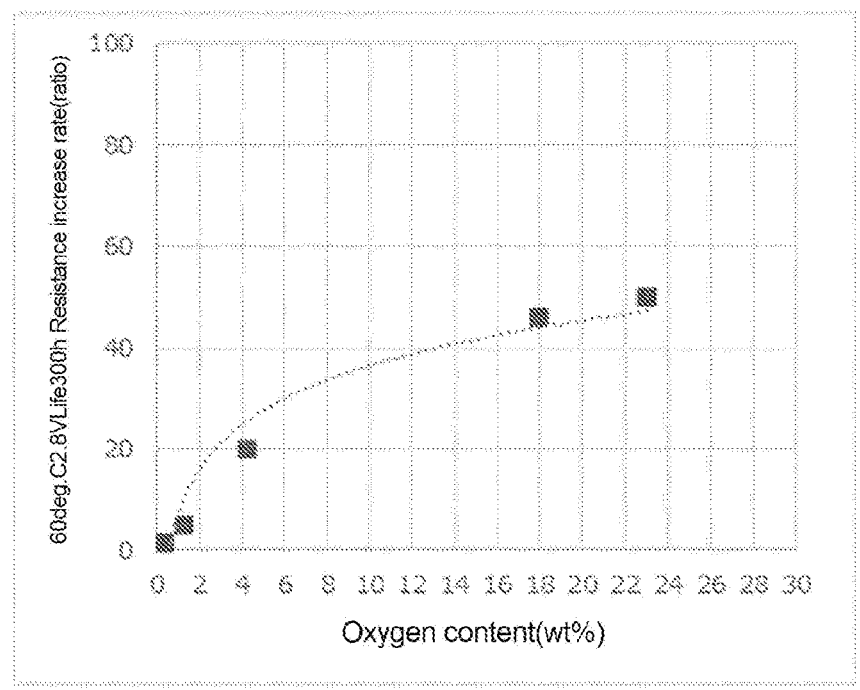
FIG. 7A is a diagram showing a relationship between the oxygen content of active material and resistance increase rate after 300 hours from a reliability test (60° C./2.8 V).

FIG. 7A is a diagram obtained by re-plotting the data shown in FIG. 4 so as to show a relationship between the oxygen content and the resistance increase rate after 300 hours from float charging FIG. 7A shows a tendency of an exponential reduction in the resistance increase rate as the oxygen content of the active material decreases. Here, the resistance increase rate is the proportion of the resistance value after 300 hours from float charging relative to the initial resistance value after aging. The resistance value can be measured based on the method specified in IEC 62391-1.

Figure 7B:
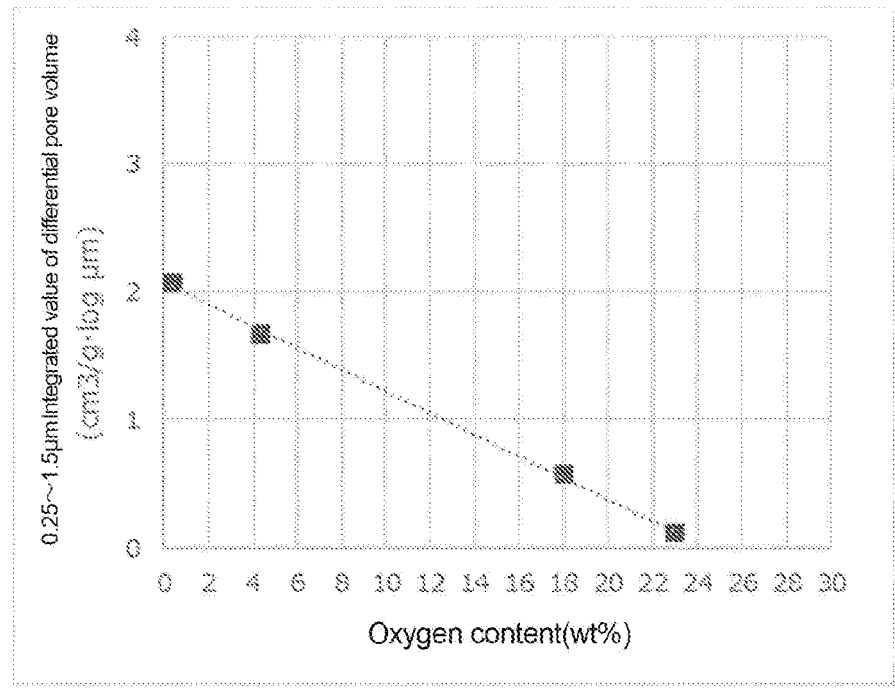
FIG. 7B is a diagram showing a relationship between the oxygen content of active material and integrated value of differential pore volume of pores with a pore size of 0.25 μm to 1.5 μm.

FIG. 7B is a diagram showing a relationship between the oxygen content of the active material and the integrated value of differential pore volume of pores with a pore size of 0.25 μm to 1.5 μm of the capacitors A1, A3, B1, and B2. From FIG. 7B, it can be seen that the volume of macropores with a pore size of 0.25 μm to 1.5 μm in the electrode layer increases as the oxygen content of the active material decreases. This suggests that the oxygen content of the active material is highly relevant to the increase in the volume of macropores in the electrode layer.

INDUSTRIAL APPLICABILITY

According to the present invention, it is possible to obtain a highly reliable capacitor (for example, electric double layer capacitor).

The present invention has been described in terms of the presently preferred embodiment, but the disclosure should not be interpreted as limiting. Various alterations and modifications will no doubt become apparent to those skilled in the art to which the present invention pertains, after having read the disclosure given above. Accordingly, it is to be understood that the appended claims be interpreted as covering all alterations and modifications which fall within the true spirit and scope of the present invention.

REFERENCE SIGNS LIST 1 capacitor element
2 first electrode
3 second electrode
4 separator
5a first lead wire
5b second lead wire
6 outer case
7 sealing member
10 capacitor

The invention claimed is:

1. A capacitor electrode comprising:
a conductive substrate; and
a flaky carbon that is electrically connected to the conductive substrate, the flaky carbon having an oxygen content of less than 5 mass % and a three-dimensional structure, wherein:
a log differential pore volume distribution of the capacitor electrode measured based on mercury porosimetry has a maximum peak in a range of 0.3 μm or more and 6 μm or less, and
an integrated value of differential pore volume of pores with a pore size of 0.25 μm to 1.5 μm is greater than 2 $cm^3/g \cdot \log$ μm.

2. The capacitor electrode in accordance with claim 1, wherein the oxygen content of the flaky carbon is less than 2.6 mass %.

3. The capacitor electrode in accordance with claim 1, wherein an average number of graphene sheets stacked in the carbon is 10 or less.

4. The capacitor electrode in accordance with claim 3, wherein an interlayer distance between the graphene sheets varies randomly.

5. The capacitor electrode in accordance with claim 1, wherein an X ray diffraction profile of the carbon has a diffraction peak P1 attributed to a 002 plane and also has a halo pattern attributed to an amorphous phase on a high-angle side relative to the diffraction peak P1.

6. The capacitor electrode in accordance with claim 5, wherein an interplanar distance between 002 planes of the carbon calculated from the X ray diffraction profile is 0.338 nm or more.

7. A capacitor comprising the capacitor electrode in accordance with claim 1.

* * * * *